2 Sheets—Sheet 1.

W. J. SMITH.

Assignor, by direct and mesne assignments, to THE SMITH FEED WATER HEATER AND PURIFIER COMPANY.

FEED WATER HEATER AND PURIFIER.

No. 11,089. Reissued June 24, 1890.

Witnesses:
Charles Pickles,
M. S. Reeder.

Inventor:
Wm. J. Smith,
By Fowler & Fowler
Attorneys.

THE NORRIS PETERS CO., PHOTO-LITHO., WASHINGTON, D. C.

W. J. SMITH.

Assignor, by direct and mesne assignments, to THE SMITH FEED WATER HEATER AND PURIFIER COMPANY

FEED WATER HEATER AND PURIFIER.

No. 11,089. Reissued June 24, 1890.

Witnesses:
Charles Pickles.
M. S. Reider.

Inventor:
Wm. J. Smith,
By Fowler & Fowler
Attorneys.

THE NORRIS PETERS CO., PHOTO-LITHO., WASHINGTON, D. C.

UNITED STATES PATENT OFFICE.

WILLIAM J. SMITH, OF SAN FRANCISCO, CALIFORNIA, ASSIGNOR, BY DIRECT AND MESNE ASSIGNMENTS, TO THE SMITH FEED WATER HEATER AND PURIFIER COMPANY, OF ILLINOIS.

FEED-WATER HEATER AND PURIFIER.

SPECIFICATION forming part of Reissued Letters Patent No. 11,089, dated June 24, 1890.

Original No. 349,181, dated September 14, 1886. Application for reissue filed January 27, 1890. Serial No. 338,308.

*To all whom it may concern:*

Be it known that I, WILLIAM J. SMITH, of the city and county of San Francisco, State of California, have invented an Improvement in a Feed-Water Heater and Purifier; and I hereby declare the following to be a full, clear, and exact description of the same.

My invention relates to an apparatus for heating and purifying the feed-water before it is introduced into the boiler.

It consists of a tubular chamber extending through one end of the boiler to nearly or quite its whole length, said chamber having within it a horizontal diaphragm, which divides it into two parts. Water is first introduced through the proper pipes into the lower part, passing along the tube and through vertical holes or perforations made at the inner end of the diaphragm into the upper part of the chamber, where it returns above the diaphragm, and is finally discharged into the boiler through openings made in the upper part of the tubular chamber near the receiving end.

It also consists in a means for closing the end of the chamber, so as to make a tight and easily removable head, whereby the interior may be easily inspected.

Figure 1:
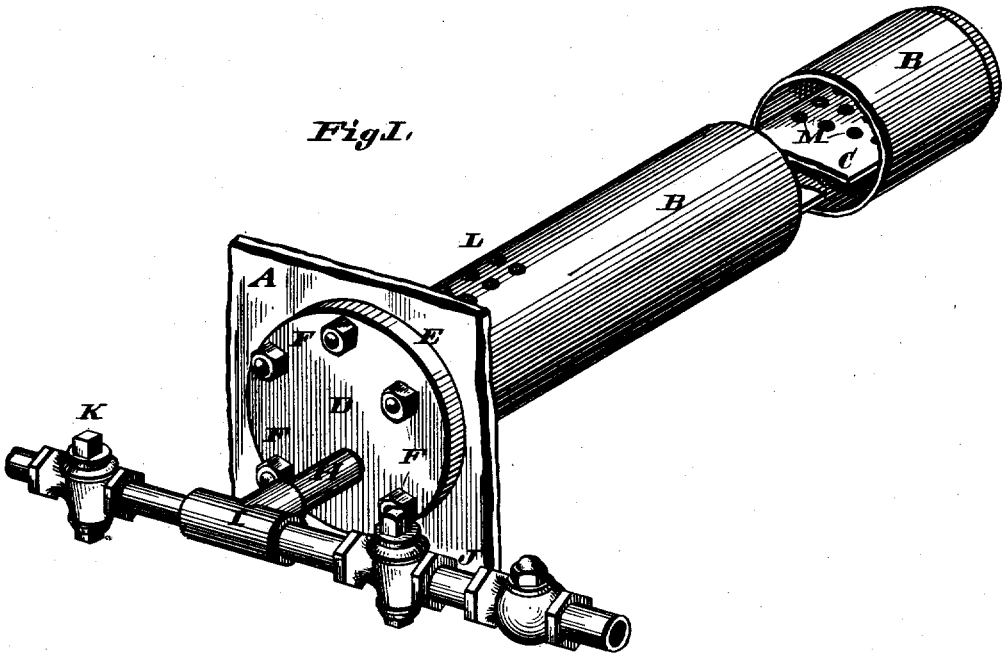
Figure 2:
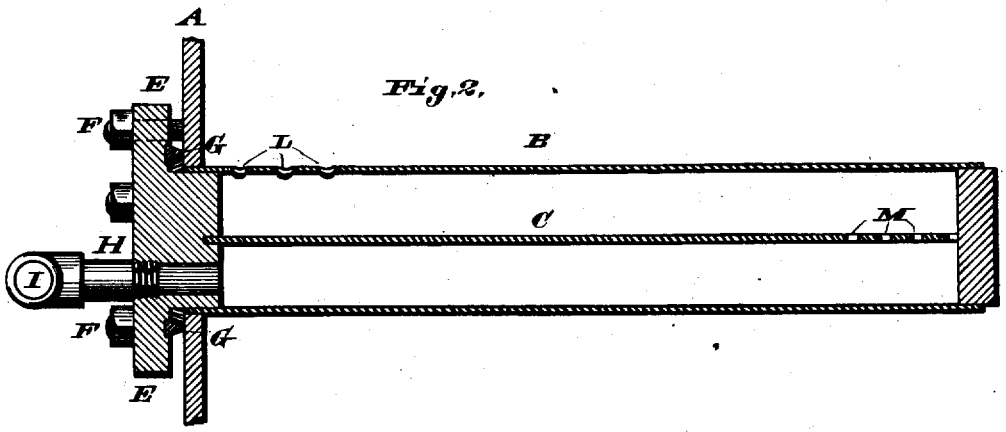
Figure 3:
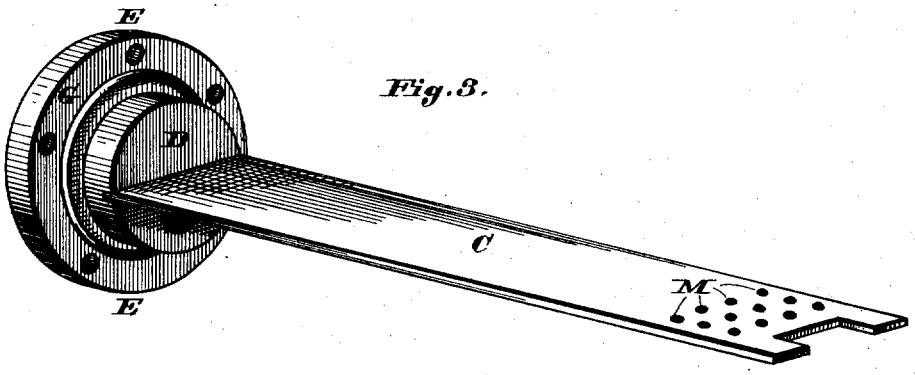
Figure 4:
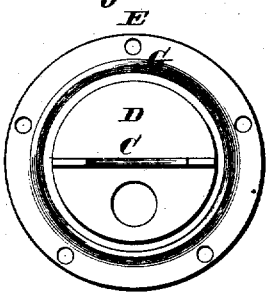

Referring to the accompanying drawings for a more complete explanation of my invention, Figure 1 is a view of my apparatus. Fig. 2 is a longitudinal vertical section. Fig. 3 is a view of the head, showing the manner of making the joint; and Fig. 4 is an elevation of the same.

A represents the tube-sheet or end of the boiler, through which a tubular chamber B is introduced, extending nearly or quite the length of the boiler in a horizontal position, and having its center at or about the water-level. The end within the boiler is closed by a plug welded or otherwise secured, so as to permanently close this end. Within this tubular chamber is fitted a horizontal diaphragm C. This diaphragm is preferably introduced by heating the tube so as to expand it, when the diaphragm may be easily slipped into place, extending the whole length of the tube, and when the tube has cooled it will be held rigidly by the contraction of the tube without other fastening.

D is a head, which fits into the front end of the tube, or that one passing through the boiler-head, and it has a transverse slot made in it, which fits over the edge of the horizontal diaphragm at this end, thus making a tight joint and holding the diaphragm in proper position. The head D has a flange E with bolt-holes, which fit over the bolts F projecting from the head, through which the chamber A passes, and by means of nuts upon the outer ends of these bolts the flange is drawn down and secured. Around this flange and inside of the circle of the bolt-holes and outside of the head D is a V-shaped projecting ridge G, made of copper or other soft metal, and when the flange is drawn down by screwing up the nuts this metallic ring will be compressed against the end of the plate through which the tube A passes, thus making a perfectly steam and water tight joint, so that it is not necessary to pack the tube or make a specially tight joint where it passes through the head, the joint being formed by this ring, as before stated. Through the lower part of the head D a hole is bored and the tube H screwed into it. This tube connects by a T-connection I with the feed-water pipe J and the blow-off pipe K, these pipes having the proper check valves or cocks, as shown.

The upper part of the tube or chamber A is perforated with holes at a point near the head, through which it enters the boiler, as shown at L, and the horizontal plate or diaphragm is also perforated with holes at or near the opposite end of the chamber A, as shown at M. A small space may also be left at the extreme end of the diaphragm or a slot cut at that point, as shown.

The operation of the device will then be as follows: Water being admitted through the feed-pipe J will pass through the hole in the lower part of the head D, flowing along the bottom of the tube, where it becomes heated by the action of the steam or water around the exterior of the tube, and when it reaches the end of the tube it will rise through the holes M in the horizontal diaphragm into the upper chamber, whence it flows back to the front end and passes out into the boiler through the holes in the top of the chamber, as shown at L. By this action the water is heated, so that it is introduced into the boiler at a high temperature, and in the action of heating it is caused to deposit impurities which are contained in it by the well-known action caused by the heating of water, these impurities being retained in the tubular chamber. When it is desired to clean this chamber out at intervals, the check valves or cocks in the water-supply pipes are closed and the cock of the blow-off pipe K is opened. Steam thus entering the top of the chamber A through the holes L and passing along above the diaphragm passes downward into the lower part through the holes M and the slot at the end, thence returning passes out through the opening and pipe through the head D, and thence through the blow-off pipe. This action completely carries off all sediment or deposit which has collected upon the surface of the diaphragm and in the lower part of the tube, thus leaving it perfectly clean. I am aware that feed-water heaters have been made with tubes arranged one within another; but I am not aware that such a construction as I have here shown has been employed.

Having thus described my invention, what I claim as new, and desire to secure by Letters Patent, is—

1. In a feed-water heater, the horizontal tubular chamber extending into the boiler, having its inner end hermetically closed and having perforations in the top near the entering end, in combination with a horizontal diaphragm fixed within the tubular chamber and having perforations through the inner end, together with a closed head fitting the outer end of the tubular chamber, a passage through said head, by which water is admitted into the lower compartment, substantially as herein described.

2. A horizontal tubular chamber extending into the boiler, having the inner end closed, the outer end fixed in the boiler head or sheet, a horizontal diaphragm extending through the tubular chamber, perforations being made at the inner end of the diaphragm and near the entering end of the upper part of the tube, in combination with a head fitting the entering end of the tube and having a slot into which the edge of the diaphragm fits, substantially as herein described.

3. A horizontal tubular chamber extending into the boiler, having its upper part perforated near the entering end, the horizontal diaphragm fitting in said tube and having perforations through its inner end, in combination with a head fitting the entering end of the tube and slotted to receive the edge of the diaphragm, a flange and bolts by which said head is secured in place, and a soft-metal packing-ring secured to the flange, so as to be compressed by the plate through which the tube passes to make a joint, substantially as herein described.

4. A feed-water-heating attachment to steam-boilers, having a heating and purifying chamber composed of separate but communicating passages, forming a continuous space, with feed-water apertures at the end inside the boiler and a feed-inlet and a blow-off outlet at the opposite end and outside the boiler.

5. In combination with a steam-boiler, the feed-water heating and purifying chamber composed of parallel ways or passages, one returning on the other, of which one passage terminates outside the boiler and has a feed-water inlet and blow-off outlet in that end, and the other passage, terminating inside the steam-generating space, is provided with feeding-in apertures.

In witness whereof I have hereunto set my hand.

WILLIAM J. SMITH.

Witnesses:
S. T. BLEYER,
A. C. FOWLER.